C. L. PECK.
ROTATING SCREEN FILTER.
APPLICATION FILED OCT. 5, 1918.
1,338,999.
Patented May 4, 1920.
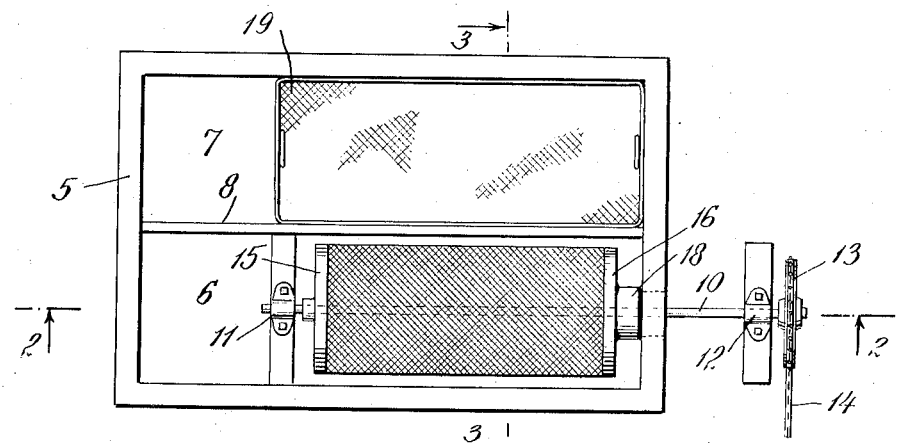
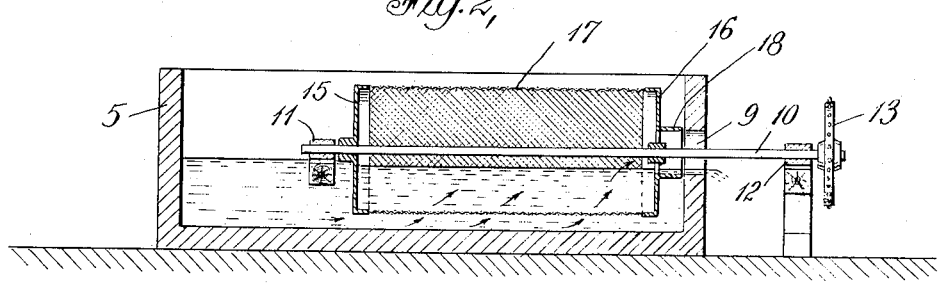
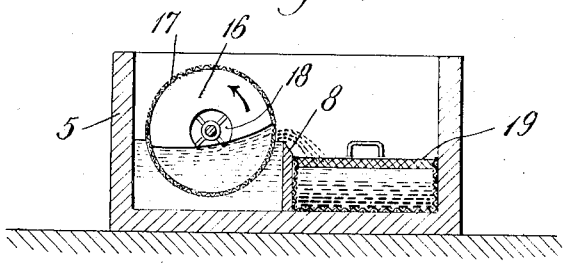
Inventor
Charles Lee Peck
By his Attorneys
Pennie, Davis, Marvin & Edmonds

UNITED STATES PATENT OFFICE.

CHARLES LEE PECK, OF NEW YORK, N. Y., ASSIGNOR TO THE DORR COMPANY, A CORPORATION OF DELAWARE.

ROTATING-SCREEN FILTER.

1,338,999. Specification of Letters Patent. Patented May 4, 1920

Application filed October 5, 1918. Serial No. 256,971.

*To all whom it may concern:*

Be it known that I, CHARLES LEE PECK, a citizen of the United States, residing at New York city, in the county of New York, State of New York, have invented certain new and useful Improvements in Rotating-Screen Filters; and I do hereby declare the following to be a full, clear, and exact description of the invention, such as will enable others skilled in the art to which it appertains to make and use the same.

This invention relates to a liquid screening apparatus, and has for its object the provision of certain improvements in the construction of such apparatus.

In the treatment of sewage, trade waste waters, and the like, I have found that a rotating cylindrical screen can be very effectively employed for screening or filtering the liquid under treatment. I have found, in particular, that a screen having a hollow foraminated cylindrical member rotatably mounted in a suitable receptacle containing the liquid to be screened and arranged to permit a flow of liquor from the receptacle through the foraminated member into the interior of the screen and out one end thereof can be very successfully used for screening or filtering sewage or trade waste liquors, such, for example, as the waste liquors of the hide-treating art. I have discovered, however, that existing forms of such rotating cylindrical screens possess certain structural defects which render their continued satisfactory use for screening sewage or trade waters impracticable, and it is the particular aim of the present invention to provide an improved liquid screening apparatus in which such defects are eliminated.

As at present constructed, rotary cylindrical screens of the type just mentioned have a central discharge pipe communicating with the interior of the screen and extending through a discharge opening in the liquid containing receptacle. In the use of such a device for screening trade waste waters, and in particular, the waste liquors of the hide-treating art, I have found that solid material works its way into the space between the opening in the receptacle and the discharge pipe and eventually becomes so firmly packed therein that the rotatable screen becomes stalled. When the liquid under treatment contains fibrous or stringy material, such as pieces of cloth, or vegetable or animal fibers, and more particularly hair, fleshings and fragments of hide in the case of the waste liquors of the hide-treating art, the difficulties resulting from the packing of such solids between the opening in the receptacle and the discharge pipe become so great as to render the use of the apparatus impracticable for the screening of such liquors.

In accordance with the improvements of the present invention, the rotary cylindrical screen is provided with a discharge spout shorter than the distance between the liquor discharge end of the rotary screen and the opening in the receptacle, and thus, while the discharge spout extends into proximity with the clear liquor discharge opening of the receptacle it does not extend quite to this opening so that a narrow space is provided between the end of the spout and the adjacent wall of the receptacle. Solid material works into this narrow space and forms an effective seal, thus preventing the escape of unscreened liquid, but the relative arrangement of the parts is such that such solid matter does not impose any undue friction upon the motive means for rotating the screen.

The novel features of my improved rotary screening apparatus will be better understood from the following description of an apparatus embodying the same taken in conjunction with the accompanying drawing, in which:

Figure 1 is a plan of the apparatus, and

Figs. 2 and 3 are sectional elevations taken on the section lines 2—2 and 3—3, respectively, of Fig. 1.

The apparatus illustrated in the drawing comprises a receptacle or tank 5 for the liquid to be screened. The receptacle 5 is divided into two compartments 6 and 7 by a transverse partition 8. This partition is lower than the walls of the receptacle and is approximately of the same height as the depth of the material in the receptacle.

One of the end walls of the compartment 6 is provided with a circular opening 9. A rotatable shaft 10 extends through the opening 9 into the compartment 6 and has one bearing 11 positioned within the compartment and another bearing 12 positioned outside the compartment and independent of the receptacle. The shaft 10 may be rotated by a sprocket wheel 13 secured thereto and coöperating chain 14 driven by any suitable motive means.

A hollow cylindrical screen is secured to the shaft 10, within the compartment 6, and rotates therewith. This screen consists of a solid circular end plate 15 and an annular end plate 16 secured to the shaft in spaced relation. A hollow cylinder 17 of foraminated material is secured to the outer edges of the end plates 15 and 16 and constitutes the screening or filtering medium of the apparatus. The opening in the annular end plate 16 is concentric with the shaft 10 and forms a discharge opening for the clear or screened liquor within the cylinder 17.

The clear liquor within the cylinder 17 is directed in its discharge toward the discharge opening 9 of the receptacle by a cylindrical spout or funnel 18. This spout 18 is preferably secured to the annular end plate 16 and is concentrically positioned with respect to the shaft 10. In accordance with the present invention, the spout 18 is slightly shorter in length than the distance between the end plate 16 and the adjacent end wall of the receptacle. The spout does not, therefore, extend entirely to the end wall of the receptacle, but ends just short of this wall, so that a relatively narrow space is provided between the end of the spout and the inside surface of the end wall surrounding the opening 9. In other words, the spout 18 extends in close proximity to the opening 9 but not to or through this opening. The spout 18 is in substantial alinement with the discharge opening in the end plate 16 and the opening 9 and effectively serves to direct the liquor discharged from the interior of the cylindrical screen through the opening 9, without danger of the stalling of the screen as the result of solids working between relatively rotatable and stationary parts.

In the operation of the apparatus, the compartment 6 is filled to the top of the partition 8 with the liquid to be screened, and the cylindrical screen is rotated in the direction of the arrow in Fig. 3. The normal liquid level is slightly lower than the shaft 10 and is higher than the bottom of the registering openings in the end plate 16 and in the receptacle. The clear liquor flows through the foramina of the rotating screen, as the latter passes through the liquid in the compartment 6, leaving a deposit of sludge on the outer surface of the foraminated material. Due to the velocity of rotation of the screen, the liquid level within the screen is higher on the ascending side thereof, and the increased head of the liquor on this side of the screen exerts sufficient pressure on the deposit of sludge adhering to the outer surface of the ascending side of the screen to throw or discharge the sludge deposit over the partition 8 into the sludge collecting compartment 7. The sludge thus discharged from the screen may be collected in porous or foraminated baskets 19 and intermittently removed from the compartment 7.

The clear or screened liquor passes through the screen, as indicated by the arrows in Fig. 2, and is discharged, in large part, through the annular end plate 16 and directed to the discharge opening 9 by the spout 18. The annular space between the end surface of the spout 18 and the adjacent inside surface of the wall of the receptacle 5 becomes filled with solid material which forms an effective seal between these surfaces without occasioning any undue increase in the friction therebetween. The area of frictional contact between these two surfaces is obviously determined by the thickness of the wall of the spout 18, and this area may be made as small as is compatible with the obtaining of an effective seal. The solid matter collecting in the space between the end of the spout and the adjacent wall of the receptacle is more or less lubricated by contact with the liquid in the receptacle and the clear liquor flowing through the spout, so that there is practically no danger of such solid material becoming too firmly packed in this space. In fact, I have found in practice that my improved construction eliminates entirely the serious frictional difficulties heretofore encountered in existing forms of similar apparatus without in any manner detracting from the advantageous characteristics of such apparatus for the treatment of sewage, trade waste liquors, and the like.

The division of the receptacle 5 into a screening compartment and a sludge collecting compartment is of particular advantage, since it provides a convenient means for the withdrawal of the sludge without interfering with the screening operation. The partition 8 is so positioned that substantially all of the sludge forced off the ascending side of the screen by the hydrostatic head of the liquor within the screen is thrown over the top of the partition into the sludge collecting compartment 7. Thus, substantially none of the sludge drops back into the screening compartment 6. The top of the partition 8 may be beveled on the side of the sludge collecting compartment, as illustrated in Fig. 3; so as to guide any sludge, which might otherwise remain and accumulate on top of the partition, into the sludge collecting compartment. The top of the partition thus becomes a relatively thin edge which forms a sharp and clear cut dividing line between the two compartments. The basket or receptacle 19 may obviously be dispensed with if desired, in which case the accumulated sludge may be shoveled, manually or otherwise, from the compartment 7. When a sludge basket is employed, its foramina or perforations should be sufficiently large to enable the excess liquor to rapidly flow out of the basket, leaving behind the relatively thick sludge. For this purpose, I have found expanded metal very satisfactory for the foraminated material of the sludge baskets.

Numerous modifications in the mechanical construction and arrangement of the parts of the apparatus may obviously be made without departing from the spirit of the present invention. Thus, for example, while I have illustrated the screening medium 17 as woven, it is to be understood that other forms of foraminated or perforated material may be equally well used, such, for instance, as expanded metal, or the like. Similarly, the screening medium may be applied and secured to the end plates in any approved manner, and the particular arrangement represented in the drawings has been chosen merely for explanatory purposes.

I claim as my invention:

1. A liquid screening apparatus comprising a receptacle for the liquid to be screened, said receptacle having an opening in one wall thereof; a rotatable screen having a hollow foraminated cylindrical member arranged to permit a flow of liquor from said receptacle through said member into the interior thereof and out one end thereof, and means communicating with the interior of said member through one end thereof and extending toward but ending short of said opening and separated from said wall by a narrow space for directing the discharge of liquor from the interior of said member through the opening, the space between the end of said means and the inner surface of said wall being in the operation of the apparatus so filled with solid matter as to form a frictional contact area between said means and said wall in the form of a relatively narrow ring.

2. A liquid screening apparatus comprising a receptacle for the liquid to be screened, said receptacle having an opening in one wall thereof; a rotatable screen having a hollow foraminated cylindrical member arranged to permit a flow of liquor from said receptacle through said member into the interior thereof and out one end thereof; and a spout secured to one end of said member and communicating with the interior thereof and extending toward said opening but ending short of the inside surface of said wall, the space between said spout and said wall being in the normal operation of the apparatus filled with solid matter in the form of a relatively narrow ring and constituting the frictional contact area between said spout and said wall.

3. A liquid screening apparatus comprising a receptacle, said receptacle having an opening in one wall thereof; a hollow cylindrical screen rotatably mounted in said receptacle, and means communicating with the interior of said screen and extending toward but not to or through said opening and separated from said wall by a narrow space for directing the discharge of liquor from the interior of said screen through the opening.

4. A liquid screening apparatus comprising a receptacle, said receptacle having an opening in one wall thereof; a hollow cylindrical screen rotatably mounted in said receptacle; and a spout communicating with the interior of said screen and extending from one end thereof into proximity with but not to or through said opening, the space between the end of said spout and the inner surface of said wall being in the operation of the apparatus filled with solid matter in the form of a relatively narrow ring constituting the frictional contact area between said spout and said wall.

5. A liquid screening apparatus comprising a receptacle for the liquid to be screened, said receptacle having an opening in one wall thereof; a rotatable screen having a hollow foraminated cylindrical member arranged to permit a flow of liquor from said rceptacle through said member into the interior thereof and out one end thereof; and a spout for directing the discharge of liquor from the interior of said member through said opening, said spout being slightly shorter than the distance between the liquor discharge end of said member and said opening whereby the spout extends only into proximity with and not to said opening, thereby leaving a space between the end of the spout and the inside surface of said wall.

6. A liquid screening apparatus comprising a receptacle for the liquid to be screened, said receptacle having an opening in one wall thereof; a rotatable shaft having one bearing within and another bearing without said receptacle, a screen having a pair of circular end members secured in spaced relation to said shaft and a hollow foraminated cylindrical member secured to said end members, one of said end members having an opening removed from but registering with the opening in said wall, and a spout positioned between said openings and serving to direct the discharge of liquor from the interior of said screen through the opening in said receptacle, said spout being shorter than the distance between said openings and ending just short of the opening in said receptacle.

7. A liquid screening apparatus comprising a receptacle, a partition dividing said receptacle into a screening compartment adapted to contain the liquid to be screened and a sludge-collecting compartment, a screen rotatably mounted in said screening compartment and having a hollow foraminated member arranged to permit a flow of liquor from said screening compartment through said member into the interior thereof and out one end thereof, and means for rotating said screen, said partition and the liquor outlet of said foraminated member being relatively so proportioned with respect to height that in the operation of the apparatus sludge on the ascending side of said foraminated member is forced over said partition into said sludge-collecting compartment by the hydrostatic head of the liquor within said member.

8. A liquid screening apparatus comprising a receptacle for the liquid to be screened, a screen rotatably mounted in said receptacle and having a hollow foraminated member arranged to permit a flow of liquor from said receptacle through said member into the interior thereof and out one end thereof, a vertically disposed wall arranged in proximity to the ascending side of said screen and extending from the bottom of said receptacle to substantially the same height as the liquid level therein, and means for rotating said screen, the height of said partition being so proportioned with respect to the liquor outlet of said foraminated member that in the operation of the apparatus sludge on the ascending side of said foraminated member is forced over the top of said wall by the hydrostatic head of the liquor within said member.

9. An arrangement for separating the solid constituents from the liquid of trade waste waters, and particularly the waste liquors of the hide treating art, sewage, and the like, comprising a screening compartment adapted to contain the liquor to be screened and a sludge-collecting compartment, said compartments being separated by a vertically disposed wall of substantially the same height as the liquor in said screening compartment, a hollow rotary screen operatively mounted in said screening compartment and arranged to permit a flow of liquid from the screening compartment into the interior of the screen and out one end thereof, and means for rotating said screen, the height of said partition being relatively so proportioned with respect to the liquor outlet of said screen that in the operation of the apparatus sludge on the ascending side of said screen is forced over said wall into said sludge collecting compartment by the hydrostatic head of the liquid within the screen.

10. An arrangement for separating the solid constituents from the liquid of trade waste waters, and particularly the waste liquors of the hide treating art, sewage, and the like, comprising in combination a receptacle having a discharge opening in one wall thereof and adapted to contain the liquor to be screened, and a rotary screen associated with said receptacle and adapted in operation to be partially immersed in the liquor therein, said screen having an axially disposed discharge spout for screened liquor terminating short of the discharge opening in said receptacle, said discharge spout being separated from said wall by a narrow space which, in the operation of the arrangement, becomes so filled with solid matter as to form a frictional contact area constituting a seal between the end of the spout and the wall of the receptacle.

11. An arrangement for separating the solid constituents from the liquid of trade waste waters, and particularly the waste liquors of the hide treating art, sewage, and the like, comprising in combination a receptacle adapted to contain the liquor to be screened, a rotary screen associated with said receptacle and adapted in operation to be partially immersed in the liquor therein, said screen having an axially disposed outlet for the discharge of screened liquor, and a vertically disposed wall arranged in proximity to the ascending side of said screen and of such a height with respect to said outlet that, in the operation of the arrangement, the hydrostatic head of the liquor within the screen forces the sludge adhering to the ascending side of the screen over the top of said wall into an appropriate sludge collecting compartment, the height of said partition being not less than the height of said outlet.

12. A liquid screening apparatus comprising a receptacle for the liquid to be screened, a screen rotatably mounted in said receptacle and having a hollow foraminated member arranged to permit a flow of liquor from said receptacle through said member into the interior thereof and out one end thereof, a partition arranged in proximity to the ascending side of said screen and of substantially the same height as the liquid in said receptacle, means for rotating said screen so that the hydrostatic head of the liquor therein forces the sludge on the ascending side of the screen over the top of said partition, said receptacle having an opening in one wall thereof, and a spout communicating with the interior of said screen and extending toward but not to said opening for directing the discharge of liquor from the interior of said screen through said opening.

13. A liquid screening apparatus comprising a screening compartment adapted to contain the liquid to be screened and a sludge collecting compartment, a rotary screen operatively mounted in said screening compartment, a perforated receptacle in said sludge collecting compartment, means for rotating said screen so that the hydrostatic head of the liquor therein forces the sludge on the ascending side thereof into said receptacle, said screening compartment having an opening in one wall thereof, and a spout secured to said screen and serving to direct the discharge of liquor from the interior thereof through said opening, said spout being shorter than the distance from said screen to said opening and ending just short of the opening.

14. A liquid screening apparatus comprising a screening compartment adapted to contain the liquid to be screened and a sludge collecting compartment, said compartments being separated by a partition of substantially the same height as the liquid in said screening compartment, a rotary screen operatively mounted in said screening compartment, means for rotating said screen so that the hydrostatic head of the liquor therein forces the sludge on the ascending side thereof over the top of said partition and into said sludge collecting compartment, said screening compartment having an opening in one wall thereof, and a spout for directing the discharge of liquor from the interior of said screen through said opening, said spout being slightly shorter than the distance between said screen and said opening whereby the spout extends only into proximity with and not to said opening thereby leaving a space between the end of the spout and the inside surface of said wall.

In testimony whereof I affix my signature.

CHARLES LEE PECK.